May 29, 1928.
A. J. ARMSON
1,671,503
EXHAUST TREATING APPARATUS FOR STEAM POWER PLANTS
Filed Jan. 20, 1923     2 Sheets-Sheet 1
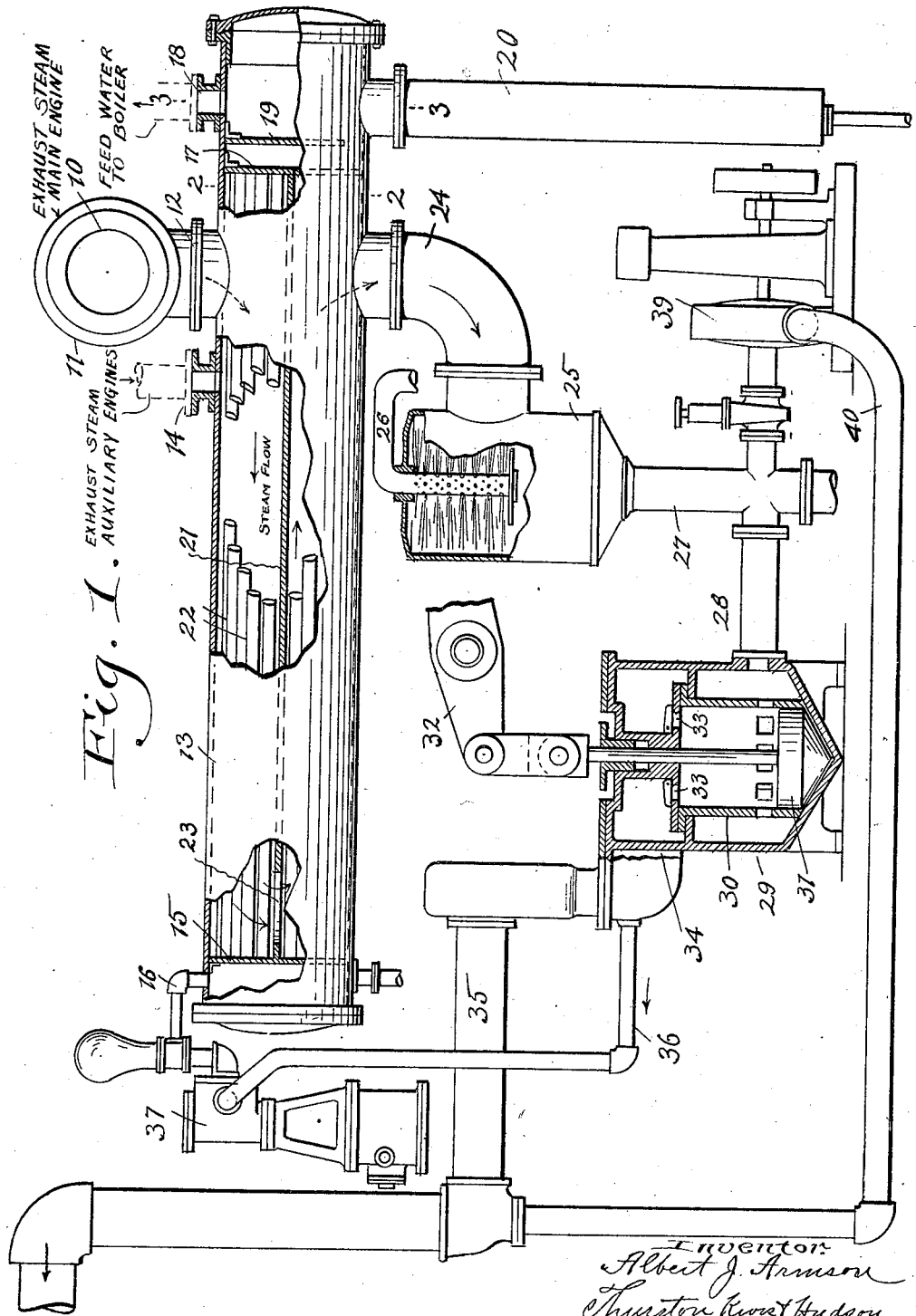

May 29, 1928.
A. J. ARMSON
1,671,503
EXHAUST TREATING APPARATUS FOR STEAM POWER PLANTS
Filed Jan. 20, 1923   2 Sheets-Sheet 2
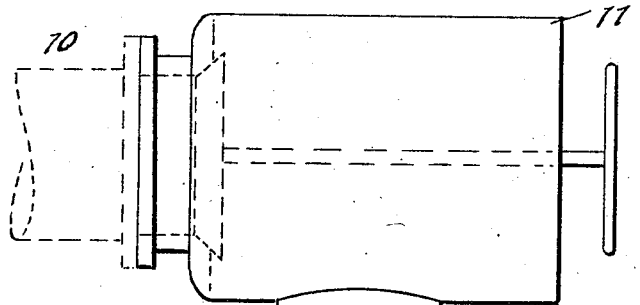
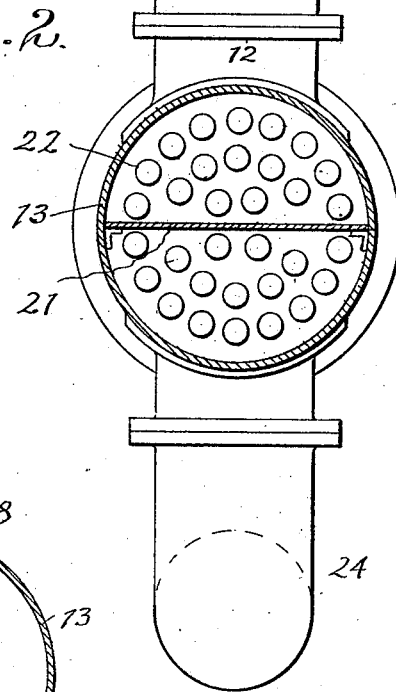
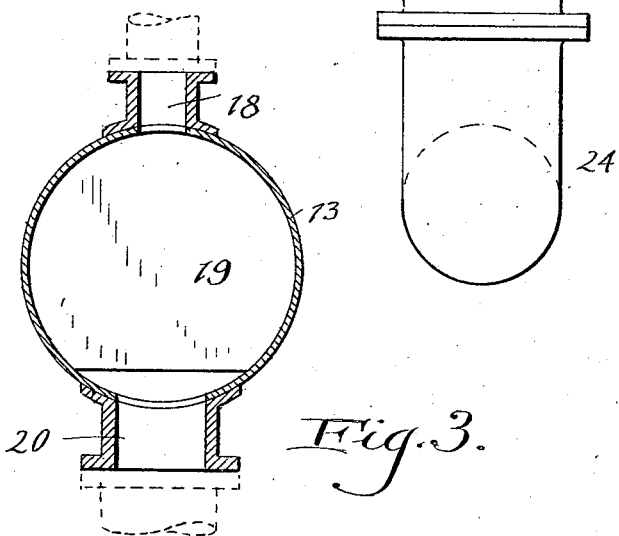

Patented May 29, 1928.

1,671,503

UNITED STATES PATENT OFFICE.

ALBERT J. ARMSON, OF PORT HURON, MICHIGAN, ASSIGNOR, BY DIRECT AND MESNE ASSIGNMENTS, TO THE ARMSON EXHAUST HEATING COMPANY, OF CLEVELAND, OHIO, A CORPORATION OF OHIO.

EXHAUST-TREATING APPARATUS FOR STEAM-POWER PLANTS.

Application filed January 20, 1923. Serial No. 613,932.

This invention relates to steam power plants and has particular reference to plants such as are employed on steam boats, especially those plying fresh water lakes as the Great Lakes, such plants having a main engine for propelling the boat and a large number of auxiliary engines, and utilizing a condenser generally a jet condenser to condense the exhaust steam from the main engine.

Heretofore in steam plants on boats of the type referred to, it has been customary, and in fact, a universal practice to lead the exhaust steam from the main engine direct to a jet condenser and to pump the boiler feed water from a well into which the condenser water is pumped and to heat the feed water by the exhaust steam from the auxiliary engine, which after passing through the heater is discharged to atmosphere.

The principal object of the present invention is to utilize more effectively than heretofore, the heat in the exhaust steam from both the main and auxiliary engines.

A further object is to improve the efficiency of the plant as a whole, by reducing the amount of waste heat, and by increasing the efficiency of the condenser part of the plant or the exhaust treating apparatus thereof, particularly by extracting much of the heat from the exhaust steam before the latter is led to the condenser, utilizing the heat thus extracted to heat the feed water passing to the boiler, and reducing the amount of water required in the condenser by virtue of the fact that steam of lower temperature is required to be condensed.

Other objects are attained by my invention which may be briefly summarized as consisting in certain novel combinations and arrangements of parts which will be described in the specification and set forth in the appended claims.

In the accompanying drawings, Fig. 1 represents diagrammatically or conventionally a portion of a steam plant involving my invention but omitting those parts such as the main and auxiliary engines and boiler which are not essential to an understanding of the invention; Figs. 2 and 3 are sectional views along the lines 2—2 and 3—3 respectively of Fig. 1.

In the drawings, 10 represents a pipe which conveys the exhaust steam from the main engine. This pipe is connected to a valve casing 11, the valve being in the nature of a shut-off valve, and this casing has an outlet 12 leading down to a horizontally disposed cylindrical chamber 13 wherein the feed water is heated and the temperature of the exhaust steam reduced as will be explained presently. The exhaust from all the auxiliary engines of the plant is preferably led to this same cylindrical chamber 13, this exhaust steam being introduced at the inlet 14 which is adjacent to the inlet 12 through which is brought the exhaust from the main engine as just stated.

At one end of the cylindrical chamber 13 there is a header 15, and between the header and the end of the chamber feed water is introduced, as will be subsequently explained, by the pipe 16. At the opposite end of the chamber there is a header 17, and between this header and the corresponding end of the chamber the heated feed water is led to the main boiler by an outlet 18. A baffle 19 which extends down from the top of the chamber 13 near the header 17, causes the water to flow downwardly and laterally over a settling chamber 20 into which most of the sediment falls, leaving the water which passes to the boiler fairly clean.

Extending horizontally through the chamber 13, between the two headers 15 and 17 there is a partition 21, and extending between the headers 15 and 17 and communicating with the spaces between the headers and the ends of the chamber are a series of horizontal feed water tubes 22 which are located both above and below the horizontal partition 21.

As will be observed from the drawing, the steam enters the chamber 13 near the right hand end thereof, and as it enters it passes lengthwise of the tubes 22 above the partition 21, and then passes down through the partition near the opposite end of the chamber through a hole 23 in the partition, and then flows along the tubes below the partition and leaves the chamber by an outlet 24 which is connected to a jet condenser 25 which may be of usual construction, the water for condensing the steam being introduced through a pipe 26.

The water utilized in condensing the steam and that obtained from the condensed steam, flows downward through an outlet 27 communicating with the bottom of the condenser, and to this outlet 27 there is connected a delivery pipe 28 communicating with a so-called air pump 29, containing an inner ported or perforated cylindrical wall 30 and a piston 31 which is operated by the main engine, the piston rod being connected to a beam 32 usually operated by the crosshead of the main engine. The piston 31 pumps water up through valved outlet ports 33 to a chamber 34 outside of the pump, and from this chamber the major portion of the water is led by a pipe 35 over-board. The water for feeding the boiler, from which steam is supplied for operating the main and auxiliary engines is led from this chamber 34, and to that end a feed water pipe 36 is connected to the chamber and to a boiler feed pump 37 operated by an engine which constitutes one of the auxiliary engines of the plant, and by this pump the feed water is forced into the space between the header 15 and the adjacent end of the chamber 13 by way of the pipe 16 already referred to, then through the horizontal pipes 22 in the chamber 13 and out by way of the outlet 18 to the boiler.

Assuming that the steam plant referred to is installed on a boat, and in the event the boat is in port and the main engine is not being used, other means must be provided for pumping away the water from the bottom of the condenser and resulting from the condensing of the steam from the numerous auxiliary engines which are being constantly used while the boat is in port. I therefore connect to the outlet 27 of the condenser 25 an auxiliary engine driven pump 39, this pump serving the same purpose as the air pump 29, and delivering water from the condenser by way of the delivery pipe 40 into the pipe 35, which as already stated, conducts the water from the air pump 29 overboard.

Thus it will be seen that the exhaust steam from both the main and auxiliary engines is passed through the chamber 13 through which the feed water is being circulated by way of the pipes 22, and that the steam from both the main and auxiliary engines, as just stated, is then passed to the condenser where it is condensed, producing a vacuum on the exhaust sides of the engines. The warm or fairly hot water is pumped from the condenser and a portion of this is supplied to the pipes 22 about which the exhaust steam flows before it passes to the condenser. Thus a considerable portion of the heat of the exhaust steam is given up to the feed water being supplied to the boiler in which the steam is generated. This is, of course, an advantage in the way of increased efficiency of the boiler. Additionally, however, to the extent that heat in the exhaust steam is given up and delivered to the feed water, the efficiency of the jet condenser is increased, for the lower the temperature of the steam supplied to the condenser, i. e. the more heat given up to the feed water, the more easily the steam is condensed; that is to say, the less water is required for condensing the steam. This in another respect increases the efficiency of the plant for the reason that smaller pumps and less energy to operate the pumps are required to carry away the water which passes from the bottom of the condenser through the pipe 27.

I do not desire to be confined to the exact details or combinations shown and described, but aim in my claims to cover all modifications which do not involve a departure from the spirit and scope of my invention.

Having described my invention, I claim:

1. In a steam power plant, a pipe for delivering exhaust steam from an engine, a condenser in which the steam is adapted to be condensed, a chamber between said pipe and the condenser through which the exhaust steam is passed, means for passing feed water through the chamber so that a portion of the heat of the exhaust steam will be transferred to the feed water, means for obtaining the feed water directly from the outlet of the condenser, means for delivering the heated feed water from said chamber, and means associated with said chamber for causing said water to be freed of sediment before being delivered from said chamber.

2. In combination in a steam power plant, a pipe for delivering exhaust steam from an engine, a condenser, a chamber between said pipe and the condenser, a series of feed water pipes extending through said chamber, a water outlet chamber with which the pipes communicate, an outlet pipe at the top of the outlet chamber, a settling chamber beneath the outlet chamber and communicating with the bottom thereof, means for causing the steam to pass along said pipes before passing to the condenser, means for pumping water from the condenser, a feed water pump receiving water delivered from the condenser and delivering water to said pipes in the chamber, and means associated with said chamber for directing the water from said pipes to the bottom of the outlet chamber over the settling chamber.

3. In combination in a steam power plant, a pipe for delivering exhaust steam from an engine, a condenser, a chamber between said pipe and the condenser and through which the steam flows before passing to the condenser, a pump for delivering water from the condenser, a feed water pump receiving water taken from the condenser directly from the outlet of said pump and delivering the same to said chamber, means for delivering the heated water from said chamber, and means for causing said water to be freed of sediment before being delivered from said chamber.

In testimony whereof, I hereunto affix my signature.

ALBERT J. ARMSON.